Feb. 10, 1959 C. L. WANLASS 2,873,363
LOGICAL GATING SYSTEM FOR DIGITAL COMPUTERS
Filed Jan. 18, 1954
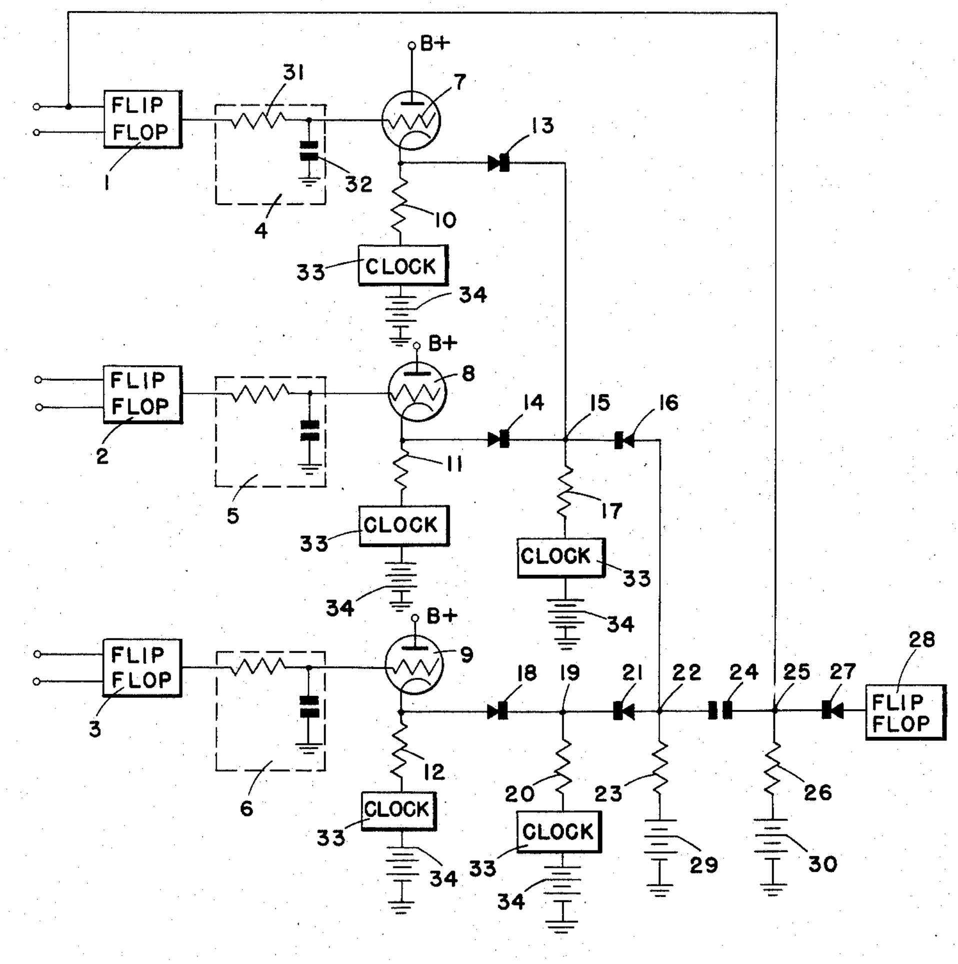
INVENTOR.
CRAVENS L. WANLASS
BY William R Lane
ATTORNEY United States Patent Office 2,873,363

Patented Feb. 10, 1959

2,873,363

LOGICAL GATING SYSTEM FOR DIGITAL COMPUTERS

Cravens L. Wanlass, Whittier, Calif., assignor to North American Aviation, Inc.

Application January 18, 1954, Serial No. 404,448

7 Claims. (Cl. 250—27)

This invention relates to a gating system used in digital computers and it particularly relates to a method of reliably gating binary information in the computer.

Digital computers use a system of logical circuitry through which the flow of information occurs at synchronized intervals indicated by a signal from a reference. This signal is termed the "clock pulse." In a similar explanation, the clock pulse allows reading of the various sources of information throughout the computer simultaneously.

In practical design, the reliability of a computer is a major factor. It is necessary that the logical system cause no disturbance upon the sources of information while the clock pulse is allowing information to flow from the source to the logical system.

Inasmuch as the computer uses a considerable number of electronic components, some of which are heat sensitive (e. g. germanium diodes), power consumption and heat transfer are important factors. They should, of course, be kept to a minimum.

Logically circuitry can be considered to be a network of elements jointly responsive to impulse information received from a plurality of sources such as flip-flops, electronic storage devices, oscillators, etc., and delivering at its output information reflecting various functions of its input.

It is therefore an object of this invention to provide a logical gating system which effectively isolates the logical circuitry from the pulse information sources.

It is another object of this invention to provide a new gating system which reduces considerably the amount of power required to gate information within a digital computer.

It is a further object of this invention to provide a reliable logical gating system.

Other objects of invention will become apparent from the following description taken in connection with the accompanying drawing.

Referring now to the single figure there is indicated a typical connection of flip-flops 1, 2, and 3 (also known as bistable multivibrators) through integrating circuits 4, 5, and 6 to drive the grids of tubes 7, 8, and 9, respectively. These tubes are operated as cathode followers with a B+ plate supply of 250 volts, for example. The output is taken across cathode resistors 10, 11, and 12. The anodes of diodes 13 and 14 are connected to the cathodes of tubes 7 and 8 and the cathodes of these same diodes are connected together at point 15 together with the cathode of output diode 16 and resistor 17. The anode of diode 18 is connected to the cathode of tube 9. The cathode of diode 18 is connected to common point 19 along with resistor 20 and the cathode of output diode 21. The anodes of output diodes 16 and 21 are connected at a common point 22 together with resistor 23 and capacitor 24. The other side of capacitor 24 is connected to common point 25 together with resistor 26 and the cathode of diode 27. The anode of diode 27 is connected to flip-flop 28.

Voltage level information is transformed to pulse information which information is gated through the cathode followers and the diodes by negative clock pulses from a single source 33 which is connected between all cathode resistors 10, 11, 12, resistors 17, 20, and a secondary B+ supply 34 of, say, 80 volts. Resistors 17 and 20 are approximately equal to the cathode resistors. Resistors 23 and 26 are connected to voltage sources 29 and 30. It is apparent that other electronic valves besides triode vacuum tubes may be used. Transistor circuits of a similar nature offer another possibility. The important features are the isolation of the load from the source and conduction by the electronic valve in accordance with its control element only during the clock pulse intervals.

The logical circuit illustrated is binary in form, that is, it computes using only two states of information. Each of flip-flops 1, 2, and 3 may have received information from an outside source and may provide a high potential or low potential output. It is arbitrarily assumed that the two stable states of the flip-flops are true and false and that the output of the flip-flop representing the false state is a high potential, 80 volts, and the output representing the true state is a low potential, 60 volts. Diodes 13 and 14 are connected in and "and" configuration. Assuming that flip-flop 1 is in the false state, its output is of high potential. This causes the grid of tube 7 to be at the high potential. However, tube 7 is operated so that it will not conduct until a negative clock pulse is received at its cathode through resistor 10. When the clock pulse occurs, tube 7 conducts and its cathode assumes a potential equal to the grid. If the grid is high, 80 volts, the cathode becomes 80 volts; if the grid is low, 60 volts, the cathode becomes 60 volts. Therefore, the digital information expressed in voltage levels received from a flip-flop by a grid is transferred to the cathode of the tube. The transferring, or "gating," occurs only during the clock pulse intervals.

During the same clock pulse, diode 13 will conduct if the voltage level of the cathode is high or 80 volts. Diode 13 will also conduct if the cathodes of tubes 7 and 8 are both true or at 60 volts. Diode 13 will not conduct if the voltage of the cathode of tube 7 is at 60 volts and the cathode of tube 8 is at 80 volts. The operation of tube 8 and diode 14 is the same as for tube 7 and diode 13. If flip-flops 1 and 2 are true, the cathodes of both tubes become 60 volts and point 15 becomes 60 volts. If both flip-flops are false, the cathodes of both tubes become 80 volts and point 15 becomes 80 volts, false. If one flip-flop is true and the other false, point 15 will assume the potential of the higher. The above description is the logic of an "and" circuit, point 15 registering true only if flip-flops 1 and 2 are both true.

An important feature of the operation is that tubes 7 and 8 and diodes 13 and 14 conduct only during the clock pulse intervals. Consequently, if successive clock pulses are spaced apart and are of short duration, power consumption is reduced. Until the clock pulse occurs, there is no load on the diodes and, further, they are biased in a non-conducting state. Reliability is enhanced because of this, and the back resistance of a particular diode may reduce to a fraction of its original value without causing malfunction in the computer. Also, the logical circuits when gated in this manner will function regardless of large variations in supply voltage.

Similarly to diodes 13 and 14, diode 18 is connected to a cathode follower. When a negative clock pulse is received through resistor 20 and flip-flop 3 is in a false or high state, the cathode voltage of tube 9 becomes equal to the grid voltage, diode 18 conducts, and point 19 becomes equal to the cathode voltage of tube 9.

Voltage source 29 is of the same potential as the high potential output of the flip-flops, 80 volts. Current will flow in resistor 23 and point 22 decreases in potential whenever a clock pulse is received through resistors 17 and 20, and either point 15 or point 19 is true or at a low potential.

This may also be expressed by saying that point 22 assumes the potential of point 15 or 19, whichever is lower. In the situation of both at a high potential, no current flows through resistor 23. Capacitor 24 receives no negative pulse and point 25 remains unchanged in potential. Final diode 27 is biased to a non-conducting state by voltage source 30 to which it is connected through resistor 26. Voltage source 30 is less than source 29. Source 29 is of a plate voltage level, and source 30 is of a grid voltage level. Capacitor 24 allows their interconnection. If no negative pulse is received at point 25, no pulse appears at the flip-flop 28.

In the logical "and," "or" circuitry illustrated, flip-flop 28 will change state if flip-flops 1 and 2 are true, or flip-flop 3 is true. Limitless logical "and," and "or" combinations may be devised from these examples.

A feedback circuit from point 25 may enable a flip-flop to enter into its own logic. Flip-flop 1 is indicated as being controlled, in addition to its input signals, by the output at point 25. For this feedback, it is necessary that the information be delayed slightly within the circuit to prevent "self gating" or to prevent the flip-flop from changing state while the information is being gated by the clock pulse. This delay is accomplished by the integrating networks 4, 5, and 6. In network 4, resistor 31 and capacitor 32 have a time constant such that capacitor 32 charges and discharges at approximately the maximum frequency flip-flop 1 is required to operate, but lagging by at least the width of a clock pulse. Assuming that information has been gated in to flip-flop 1 on a clock pulse, the delay network will prevent new information from being received by cathode follower 7 until the clock pulse is completed. This is required so that information is acted upon one step at a time, or once for every clock pulse.

If the load on the logical gating system (the diodes) is light, the cathode followers may be removed and the energy in capacitor 32 and those capacitors in integrating networks 5 and 6 used directly to drive the "and" and "or" circuits.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A binary electronic gating circuit comprising a plurality of input channels each adapted to receive a binary signal, a channel output electronic valve in each channel, means for normally biasing each of said valves to non-conduction, logical gating means connected to receive signals conjointly from said valves and to provide an output which is a predetermined logical function of the signals received in said input channels, said gating means comprising a plurality of electronic valves normally biased to non-conduction, a clock pulse source, and means responsive to said clock pulse source for individually and simultaneously disabling the biasing of all of said valves.

2. A logical system comprising a plurality of flip-flops each adapted to provide digital informaion expressed as potentials of two levels, respective cathode followers each having a cathode and anode, respective signal delay means adapting said respective cathode followers to receive the output of said flip-flops, each cathode follower adapted to conduct in accordance with the output of its respective flip-flop only when the cathode of said cathode follower is negatively pulsed with respect to the anode thereof, respective diodes having cathodes and anodes and whose anodes are connected to receive the output of said cathode followers, means for negatively pulsing the cathodes of said cathode followers and said diodes, respective output diodes having cathodes and anodes and whose cathodes are connected to receive the output of one or more of said preceding diodes, a voltage source connected to place a positive potential on the anodes of said output diodes, a capacitor connected on one side to receive the output of said output diodes, a voltage source connected at its positive end to the other side of said capacitor, feedback means from the other side of said capacitor to at least one of said flip-flops, a final diode connected to said capacitor on the same side as said voltage source, and a flip-flop responsive to the output of said final diodes.

3. A logical gating system comprising a plurality of flip-flops, respective signal delay means connected to receive the output of each said flip-flops, respective cathode followers responsive to the output of said signal delay means, each cathode follower having a cathode and anode and operated to conduct in accordance with the output of its respective flip-flop only when the cathode of said cathode follower is negatively pulsed with respect to the anode, means for negatively pulsing said cathode follower at prescribed intervals, logical circuitry responsive to the output of said cathode followers, and feedback means from the output of said logical circuitry to the input of at least one of said flip-flops.

4. The combination recited in claim 3 wherein said signal delay means comprises an R.–C. circuit.

5. A logical gating system comprising a plurality of flip-flops, a plurality of cathode followers connected to receive the output of said flip-flops, logical circuitry comprising a plurality of diodes connected to receive the output of said cathode followers, a resistor connected to the cathode of each said diode, means connected to each said resistor for negatively pulsing the cathode of each said diode at prescribed intervals, an output diode receiving at its cathode the output of said one or more diodes, and a voltage source connected to place a positive potential on the anode of said output diode, a capacitor connected on one side to receive the output of said output diode, a voltage source connected to the remaining side of said capacitor, and a feed back circuit from the output side of said capacitor having a conductive connection to at least one of said flip-flops.

6. A digital electronic circuit for binary signals comprising input channels for receiving electrical signals of two alternative voltage levels, a cathode follower in each said channel, logical circuitry comprising a plurality of logical gates jointly responsive to signals received in said channels for providing an output which is a predetermined logical function of said input signals, means for normally biasing each of said gates and cathode followers to nonconduction, means for generating a train of clock pulses at a predetermined repetition rate, and means for separately applying said clock pulses to all of said gates and cathode followers simultaneously in a sense to disable the bias thereof repetitively at predetermined time spaced intervals.

7. A digital electronic circuit for binary signals comprising input channels for receiving electrical signals of two alternative voltage levels, a cathode follower in each said channel biased to non-conduction, logical circuitry comprising a plurality of logical gates jointly responsive to signals received in said channels for providing an output which is a predetermined logical function of said input signals, each said gate including at least an input diode normally biased to non-conduction, means for generating a train of clock pulses, and means for separatively applying said clock pulses to all of said diodes and cathode followers simultaneously in a sense to disable the bias thereof repetitively at predetermined time spaced intervals.

References Cited in the file of this patent

UNITED STATES PATENTS

| | | |
|---|---|---|
| 2,422,064 | Anderson et al. | June 10, 1947 |

(Other references on following page)

UNITED STATES PATENTS

| | | |
|---|---|---|
| 2,443,195 | Pensyl | June 15, 1948 |
| 2,460,061 | Chapin | Jan. 25, 1949 |
| 2,570,716 | Roschester | Oct. 9, 1951 |
| 2,622,193 | Clayden | Dec. 16, 1952 |
| 2,662,983 | Gorden | Dec. 15, 1953 |
| 2,674,727 | Spielberg | Apr. 6, 1954 |
| 2,706,811 | Steele | Apr. 19, 1955 |
| 2,760,087 | Felkner | Aug. 21, 1956 |
| 2,762,936 | Forrest | Sept. 11, 1956 |
| 2,807,716 | Steele | Sept. 24, 1957 |

OTHER REFERENCES

Proceedings of the I. R. E., January 1952, vol. 40, No. 1, "Logical Description of Some Digital-Computer Adders and Counters," Gray, pages 29 to 33.

UNITED STATES PATENT OFFICE

CERTIFICATE OF CORRECTION

February 10, 1959

Patent No. 2,873,363

Cravens L. Wanlass

It is hereby certified that error appears in the printed specification of the above numbered patent requiring correction and that the said Letters Patent should read as corrected below.

Column 1, line 35, for "Logically" read -- Logical --; column 2, line 2, after "which" strike out "information"; line 24, for "and", second occurrence, read -- an --; column 4, line 67, for "separatively" read -- separately --.

Signed and sealed this 4th day of August 1959.

(SEAL)
Attest:

KARL H. AXLINE
Attesting Officer

ROBERT C. WATSON
Commissioner of Patents